United States Patent [19]

Liau et al.

[11] Patent Number: 4,588,613

[45] Date of Patent: May 13, 1986

[54] PROCESS FOR REDUCING POLYMER BUILDUP

[75] Inventors: Shung-Chung Liau; Kuo-Shu Tseng, both of Delaware City, Del.; Yen H. Huang, Florham Park, N.J.

[73] Assignee: Formosa Plastics Corporation, Taiwan, China

[21] Appl. No.: 659,359

[22] Filed: Oct. 10, 1984

[51] Int. Cl.$^4$ .............................................. C08F 2/00
[52] U.S. Cl. ..................... 427/230; 526/62; 427/239
[58] Field of Search ................ 526/62; 427/230, 239

[56] References Cited

U.S. PATENT DOCUMENTS

| | | |
|---|---|---|
| 4,007,320 | 2/1977 | Petersen . |
| 4,016,341 | 4/1977 | Ogawa ................................ 526/62 |
| 4,076,951 | 2/1978 | Katayama et al. . |
| 4,080,173 | 3/1978 | Cohen . |
| 4,093,787 | 6/1978 | Burgess ................................ 526/62 |
| 4,200,712 | 4/1980 | Cohen . |
| 4,320,215 | 3/1982 | Yonezawa et al. . |
| 4,355,141 | 10/1982 | Okada ................................ 526/62 |
| 4,431,783 | 2/1984 | Walker ................................ 526/62 |

Primary Examiner—Sam Silverberg
Attorney, Agent, or Firm—Brumbaugh, Graves, Donohue & Raymond

[57] ABSTRACT

In the polymerization of vinyl chloride monomer or a mixture of vinyl monomers having vinyl chlorides as a main component, the deposition of polymer scale on the inner walls of the polymerization vessel can be effectively reduced by coating the internal surfaces of the reactor with first, a condensation polymer of a polyhydric phenol and an aldehyde and second, a crosslinking agent to increase the insolubility of the polymeric material.

24 Claims, No Drawings

PROCESS FOR REDUCING POLYMER BUILDUP

BACKGROUND OF THE INVENTION

A common problem associated with the heterogeneous polymerization of monomers (for example vinyl chloride or other vinylidene comonomers) is the deposition of polymer on the interior surfaces of the polymerization vessel. These surfaces include the stainless steel walls of the vessel, the blades of the agitator and other metal surfaces in contact with the monomer or monomers. This scale buildup will decrease the yield of polymer product, the cooling capacity of the equipment, as well as the production efficiency of the reactor. Moreover, if the scale comes off the reactor surfaces and admixes with final product (to cause so-called "fish eyes"), the quality of the product may be substantially and adversely affected.

Due to these severe problems, it is necessary to remove any scale deposited following each polymerization run. Various kinds of scale removal methods have been proposed and employed such as solvent cleaning, hydraulic and mechanical reactor cleaners, and the like. However, this cleaning operation not only requires extensive time and labor but also causes health hazards to the workers in view, for example, of the carcinogenic property possessed by vinyl chloride monomer. Efforts have also been made to develop additives for the polymerization reaction to prevent the polymer scale on the inner walls of the reactor.

Recent developments have focused on protective coatings on the inside wall of the vessel. The surfaces of the reactor coming into contact with the monomer or monomers are coated prior to the polymerization run with dyes, or polymeric material. For example, U.S. Pat. Nos. 4,320,215; 4,076,951; 4,007,320; 4,200,712 and 4,080,173 are directed to this approach. In this regard, condensation polymers derived from polyhydric phenols and aldehydes have been found to be effective in some areas for the commercial production of PVC resins but still have some disadvantages. A good coating must have easy application procedures, stability with respect to the polymerization medium and good adhesion to the walls of the reactor.

SUMMARY OF THE INVENTION

The present invention is an improvement on the above-mentioned methods of applying a protective polymeric coating to the interior surfaces of the polymerization vessel. The improvement involves the use of a coating material, made from polyhydric phenols and aldehydes, and increasing the stability of the coating material toward the polymerization medium by a crosslinking agent. According to the invention, the interior surfaces of the reactor vessel are first coated with a condensation polymer of a polyhydric phenol and an aldehyde. Thereafter, the coating is stabilized (i.e. the solubility of coating in the polymerization medium is lessened) by treating the coating with a crosslinking agent and heating (e.g. to a temperature of from 25° to 100° C.) the coating so treated to allow crosslinking to take place.

DESCRIPTION OF THE PREFERRED EMBODIMENT

The process according to the invention is preferably used in the polymerization of vinyl chloride or a mixture of vinyl monomers having vinyl chloride as a main component. The polymerization reaction takes place in pressure vessels with water in presence of dispersing, suspending or emulsifying agents and free radical forming catalysts. Such polymerizations are normally carried out in the range of about 30° to 60° C.

The polymers useful as the coating materials are made from the condensation reactions of polyhydric phenols such as catechol, resorcinol, hydroquinone, pyrogallol, phloroglucinol, or 1,2,4-benzenetriol, and aldehydes such as formaldehyde, acetaldehyde or benzaldehyde. A good example of the above mentioned coating material is a condensation polymer of pyrogallol and benzaldehyde. This material is usually made into a 0.2 to 1% alcoholic solution before application.

The preferred crosslinking agent to be used is a composition having the formula $M(OR)n$, wherein $n=3$ or 4, $M=Ti$, Al, P and $R=$methyl, ethyl, isopropyl or acetylacetate chelate. The amount of crosslinking agent used is preferably 20 to 30 percent by weight based on the weight of coating material. Prior to application, the crosslinking agent is made into a 0.05 to 0.5% solution with appropriate aprotic solvents such as methanol and ethanol or protic solvents such as isopropyl alcohol, acetone or methylene chloride. The choice of solvent or solvents depends on the stability of the crosslinking material in these mediums. Preferably such solvents have boiling points lower than 100° C.

The vessel in which the bulk polymerization of the present invention is carried out is not particularly limited. It may be a reactor suitable for the polymerization of a mixture composed mostly of the monomer or monomers without a large amount of a liquid medium used for heat transfer and formation of monomer droplets. The vessel proper is usually glass-lined or made of stainless steel and equipped with agitators, condenser, conduit pipes, baffles, etc.

In accordance with the method of the present invention, the condensation polymer is coated on the grease free inner reactor surfaces by means of spraying or painting. After the coating treatment, a solution of crosslinking agent is applied through the same manner on the inner walls of the reactor. The crosslinking reaction of the polymer is then carried at a temperature of 25° to 100° C. depending upon the crosslinking agent used. The application should cover all the surfaces in contact with the polymerization medium. A single coating with 0.2 to 1% polymer solution and a single application of a crosslinking agent in an amount equal to 20 to 30% by weight based on the coating polymer are generally sufficient to exhibit a substantial buildup reducing effect during several polymerization runs. However, by applying a thicker coating film (i.e. through multiple spraying or painting applications), the buildup reducing effect will be longer lasting.

The crosslinked polymer film can also be used in combination with some additives such as stannous chloride, sodium nitrite, etc. and other compounds that have known scale reducing effect.

In order to further illustrate the present invention, the following examples are given. These examples are not intended to limit the scope of the invention.

EXAMPLE 1

The tests were conducted in 30 gallon and 10 gallon stainless steel pilot plant reactors. The reactors were cleaned with ethylene dichloride, water rinsed and dried. In this example, the condensation polymer of pyrogallol and benzaldehyde was employed as the coating agent. The reactors were sprayed with 100 ml and 40 ml 0.2% polymer solution (methanol as the solvent) respectively. After drying at 85° C. for 10 min. and cooling to room temperature, only the 30 gallon reactor was sprayed with 50 ml 0.1% solution of titanium acetoacetonate in methylene chloride and heated to 90° C. for crosslinking of the coating polymer. Both 30 and 10 gallon reactors were than charged with the following recipe:

| vinyl chloride monomer | 100 (parts) |
|---|---|
| deionized water | 160 |
| KH-17 | 0.2 |
| (78% hydrolyzed polyvinyl alcohol) | |
| azobisdimethylvaleronitrile | 0.005 |

The reaction temperature was maintained at 57° C. The reaction medium was agitated until a pressure drop of 1 kg/cm$^2$ was observed. The resulting polymer and the unreacted monomer were then removed from the vessel. The inner surfaces of the reactors were rinsed with water and inspected. The amount of buildup was rated from 0 for deposit free to 10 for heavy buildup based on a control run of an uncrosslinked reactor. The results are listed in Table 1.

TABLE 1

| NO. OF RUNS | CROSSLINKED (30 GAL.) | NON-CROSSLINKED (10 GAL.) |
|---|---|---|
| 1 | 0 | 0 |
| 3 | 0 | 0 |
| 5 | 0 | 0 |
| 6 | 0 | 1 |
| 7 | 0 | 2 |
| 9 | 0 | 4 |
| 10 | 0 | 5 |
| 11 | 0 | 6 |
| 13 | 0 | 8 |
| 14 | 0 | 10 |
| 15 | 1 | — |
| 17 | 2 | — |
| 19 | 4 | — |
| 20 | 5 | — |
| 23 | 8 | — |
| 25 | 10 | — |

EXAMPLE 2

The test was carried out according to the procedure of Example 1. Both the pilot plant reactors were precoated with the condensation polymer of pyrogallol and benzaldehyde. Only the 30 gallon reactor was treated with 50 ml 0.05% methylene chloride solution of trimethylphosphite and was crosslinked at 90° C. for 10 min. The same reaction mixture as in Example 1 was charged into each reactor. The results are listed in Table 2.

TABLE 2

| NO. OF RUNS | CROSSLINKED (30 GAL.) | NON-CROSSLINKED (10 GAL.) |
|---|---|---|
| 1 | 0 | 0 |
| 5 | 0 | 0 |
| 6 | 0 | 1 |
| 8 | 0 | 3 |
| 10 | 0 | 5 |
| 12 | 0 | 7 |
| 14 | 0 | 9 |
| 15 | 1 | 10 |
| 23 | 10 | — |

EXAMPLE 3

The same procedure in Example 1 was followed. In this test, the condensation polymer derived from 1,2,4-benzenetriol and acetaldehyde was employed as the coating agent. Both reactors were precoated with 0.3% polymer solution in methanol. The 30 gallon reactor was further crosslinked with 50 ml 0.1% methylene chloride solution of titanium acetoacetonate. The results are listed in Table 3.

TABLE 3

| NO. OF RUNS | CROSSLINKED (30 GAL.) | NON-CROSSLINKED (10 GAL.) |
|---|---|---|
| 1 | 0 | 0 |
| 2 | 0 | 0 |
| 3 | 0 | 0 |
| 5 | 0 | 1 |
| 7 | 0 | 3 |
| 10 | 1 | 5 |
| 13 | 2 | 9 |
| 17 | 4 | 10 |
| 21 | 7 | — |
| 25 | 10 | — |

We claim:

1. A process for reducing the buildup of polymers on the interior surfaces of a polymerization reaction vessel during a polymerization reaction, said process comprising the steps of:
   (a) coating said surfaces with a condensation polymer of a polyhydric phenol and an aldehyde wherein the polyhydric phenol is at least one of the group consisting of resorcinol, catechol, hydroquinone, pynogallol, phloroglucinol of 1, 2 4-benzenetriol;
   (b) drying the solvent from said coating; and
   (c) applying a crosslinking agent to said polymer coating thereby stabilizing said polymer coating toward the polymerization reaction medium.

2. A process according to claim 1 wherein said surfaces are coated with said condensation polymer by diluting said polymer in a solvent and then painting or spraying the diluted polymer on said surfaces.

3. A process according to claim 1 wherein the polyhydric phenol is resorcinol.

4. A process according to claim 1 wherein the polyhyudric phemol is catechol.

5. A process according to claim 1 wherein the polyhydric phenol is hydroquinone.

6. A process according to claim 1 wherein the polyhydric phenol is pyrogallol.

7. A process according to claim 1 wherein the polyhydric phenol is phloroglucinol.

8. A process according to claim 1 wherein the polyhydric phenol is 1,2,4-benzenetriol.

9. A process according to claim 1 wherein the aldehyde is at least one of the group consisting of formaldehyde, acetaldehyde or benzaldehyde.

10. A process according to claim 9 wherein the aldehyde is formaldehyde.

11. A process according to claim 9 wherein the aldehyde is acetaldehyde.

12. A process according to claim 9 wherein the aldehyde is benzaldehyde.

13. A process according to claim 1 wherein the crosslinking agent is at least one of the group consisting of trialkyl phosphite, aluminum alkoxide and organic titanate.

14. A process according to claim 9 wherein the crosslinking agent is at least one of the group consisting of trialkyl phosphite, aluminum alkoxide and organic titanate.

15. A process according to claim 13 wherein the crosslinking agent is trialkyl phosphite.

16. A process according to claim 13 wherein the crosslinking agent is aluminum alkoxide.

17. A process according to claim 13 wherein the crosslinking agent is organic titanate.

18. A process according to claim 2 wherein the polymer is diluted to a polymer solution containing from 0.2% to 1.0% polymer.

19. A process according to claim 18 wherein the solvent is an alcohol.

20. A process according to claim 19 wherein the solvent is a methanol.

21. A process according to claim 1 wherein the polymer coating is stabilized by applying from about 20 percent to about 30 percent by weight crosslinking agent based upon the weight of the polymer coating.

22. A process according to claim 21 wherein the crosslinking agent is diluted in a solvent and thereafter painted or sprayed on the coated surfaces.

23. A process according to claim 22 wherein the solvent is an aprotic solvent having a boiling point less than 100° C.

24. A process according to claim 23 wherein the solvent is methylene chloride.

* * * * *

UNITED STATES PATENT AND TRADEMARK OFFICE
CERTIFICATE OF CORRECTION

PATENT NO. : 4,588,613
DATED : May 13, 1986
INVENTOR(S) : Liau et al.

It is certified that error appears in the above–identified patent and that said Letters Patent are hereby corrected as shown below:

Column 3, line 14, "0.005" should be --0.05--.

Signed and Sealed this

Twenty-fifth Day of November, 1986

Attest:

DONALD J. QUIGG

*Attesting Officer*     *Commissioner of Patents and Trademarks*